United States Patent
Capuzzi et al.

(10) Patent No.: US 12,441,698 B2
(45) Date of Patent: Oct. 14, 2025

(54) PROCESS FOR THE SYNTHESIS OF 2,5-FURANDICARBOXYLIC ACID

(71) Applicant: Novamont S.P.A., Novara (IT)

(72) Inventors: Luigi Capuzzi, Novara (IT); Giuseppina Carotenuto, Novara (IT)

(73) Assignee: Novamont S.P.A., Novara (IT)

( * ) Notice: Subject to any disclaimer, the term of this patent is extended or adjusted under 35 U.S.C. 154(b) by 547 days.

(21) Appl. No.: 17/786,998

(22) PCT Filed: Dec. 18, 2020

(86) PCT No.: PCT/EP2020/087129
§ 371 (c)(1),
(2) Date: Jun. 17, 2022

(87) PCT Pub. No.: WO2021/123240
PCT Pub. Date: Jun. 24, 2021

(65) Prior Publication Data
US 2023/0100441 A1     Mar. 30, 2023

(30) Foreign Application Priority Data
Dec. 20, 2019   (IT) .................. 102019000025096

(51) Int. Cl.
*C07D 307/68* (2006.01)
*B01J 23/46* (2006.01)

(52) U.S. Cl.
CPC .......... *C07D 307/68* (2013.01); *B01J 23/462* (2013.01)

(58) Field of Classification Search
CPC .............................. B01J 23/462; Y02P 20/584
USPC ....................................... 549/485
See application file for complete search history.

(56) References Cited

U.S. PATENT DOCUMENTS

| | | | |
|---|---|---|---|
| 4,977,283 A | 12/1990 | Leupold et al. | |
| 10,385,033 B2 * | 8/2019 | Gordillo | ............. C07D 307/46 |
| 2008/0103318 A1 | 5/2008 | Lilga et al. | |
| 2016/0311790 A1 | 10/2016 | Janka et al. | |
| 2017/0217917 A1 | 8/2017 | Sanborn | |

FOREIGN PATENT DOCUMENTS

| | | |
|---|---|---|
| CN | 107365287 A | 11/2017 |
| CN | 108779088 A | 11/2018 |
| CN | 109666011 A | 4/2019 |
| CN | 109894140 A | 6/2019 |
| EP | 2 601 182 B1 | 9/2015 |
| EP | 2 994 458 B1 | 2/2017 |
| EP | 3 207 032 B1 | 12/2018 |
| EP | 3476840 A1 | 5/2019 |
| FR | 2669634 A1 | 5/1992 |
| JP | 2008-88134 A | 4/2008 |
| JP | 2009-1519 A | 1/2009 |
| JP | 2009-302164 A | 12/2009 |
| JP | 4718896 B2 | 7/2011 |
| JP | 2013-203666 A | 10/2013 |
| WO | WO 2012/161973 A1 | 11/2012 |
| WO | WO 2012/161973 A8 | 1/2013 |
| WO | WO 2013/191943 A1 | 12/2013 |
| WO | WO 2015/056270 A1 | 4/2015 |
| WO | WO 2016/028488 A1 | 2/2016 |
| WO | WO 2016/068712 A1 | 5/2016 |
| WO | WO 2017/123763 A1 | 7/2017 |
| WO | WO 2017/123763 A8 | 8/2018 |
| WO | WO 2019/014382 A1 | 1/2019 |
| WO | WO 2020/011996 A1 | 1/2020 |

OTHER PUBLICATIONS

Wikipedia ,NAOH, Mar. 5, 2018, pp. 2 (Year: 2018).*
International Search Report and Written Opinion, mailed Mar. 29, 2021 for International Application No. PCT/EP2020/087129.
Brunauer et al., Adsorption of Gases in Multimolecular Layers. J Am Chem Soc. Feb. 1, 1938;60(2):309-19. doi: 10.1021/ja01269a023.
Gao et al., Highly dispersed ruthenium nanoparticles on hydroxyapatite as selective and reusable catalyst for aerobic oxidation of 5-hydroxymethylfurfral to 2,5-furandicarboxylic acid under base-free conditions. Mol Catalysis. Mar. 16, 2018;450:55-64. doi: 10.1016/j.mcat.2018.03.006.
Gorbanev et al., Selective Aerobic Oxidation of 5-Hydroxymethylfurfural in Water Over Solid Ruthenium Hydroxide Catalysts with Magnesium-Based Supports. Catal Lett. Oct. 2011;141(12):1752-60. doi: 10.1007/s10562-011-0707-y.
Liu et al., Efficient synthesis of bio-monomer 2,5-furandicarboxylic acid from concentrated 5-hydroxymethylfurfural or fructose in DMSO/H$_2$O mixed solvent. J Ind Eng Chem. Apr. 27, 2019;77:209-14. doi: 10.1016/J.JIEC.2019.04.038.
PCT/EP2020/087129, Mar. 29, 2021, International Search Report and Written Opinion.
De Jong et al., Furandicarboxylic Acid (FDCA), A Versatile Building Block for a Very Interesting Class of Polyesters. In: Biobased Monomers, Polymers and Materials. Smith et al., Eds. ACS Symposium Series, American Chemical Society. 2012. Chapter 1, 13 pages.

(Continued)

*Primary Examiner* — Taylor V Oh

(74) *Attorney, Agent, or Firm* — Wolf, Greenfield & Sacks, P.C.

(57) ABSTRACT

The present invention is directed to a process for the synthesis of 2,5-furandicarboxylic acid (FDCA) comprising the steps of: (1) oxidising an aqueous solution of 5 hydroxymethylfurfural (HMF) in the presence of molecular oxygen, of a heterogeneous catalyst comprising ruthenium and of a strong base at a temperature above 100° C., obtaining a reaction product in aqueous solution comprising a salt of FDCA acid; (2) separating said heterogeneous catalyst from said reaction product in aqueous solution, and (3) re-using said heterogeneous catalyst in the oxidation reaction in step (1).

18 Claims, No Drawings

(56) References Cited

OTHER PUBLICATIONS

López-Garzón et al., Recovery of carboxylic acids produced by fermentation. Biotechnol Adv. Sep.-Oct. 2014;32(5):873-904. doi: 10.1016/j.biotechadv.2014.04.002. Epub Apr. 18, 2014.
Sajid et al., Production of 2,5-furandicarboxylic acid (FDCA) from 5-hydroxymethylfurfural (HMF): recent progress focusing on the chemical-catalytic routes. Green Chem. Oct. 24, 2018;20(24):5427-53. doi: 10.1039/C8GC02680G.
Thiyagarajan et al., Biobased furandicarboxylic acids (FDCAs): effects of isomeric substitution on polyester synthesis and properties. Green Chem. 2014;16(4):1957-66. doi: 10.1039/C3GC42184H.
Yi et al., Base-free conversion of 5-hydroxymethylfurfural to 2,5-furandicarboxylic acid over a Ru/C catalyst. Green Chem. Oct. 6, 2015;18(4):979-83. doi: 10.1039/C5GC01584G.
Yi et al., Base-free conversion of 5-hydroxymethylfurfural to 2,5-furandicarboxylic acid over a Ru/C catalyst. Green Chem. Oct. 6, 2015;18(4):979-83. doi: 10.1039/C5GC01584G. Supplementary Material, 7 pages.
[No Author Listed], Definition of "Weak Base". Dictionary of Standard Chemical Terms, Second Edition. 2005. One page. Japanese.

\* cited by examiner

PROCESS FOR THE SYNTHESIS OF 2,5-FURANDICARBOXYLIC ACID

CROSS REFERENCE TO RELATED APPLICATION(S)

This Application is a National Stage filing under 35 U.S.C. § 371 of International PCT Application No. PCT/EP2020/087129, filed Dec. 18, 2020, which claims priority to Italian Application No. 102019000025096, filed Dec. 20, 2019. The entire contents of these applications are incorporated herein by reference in their entirety.

The project that led to the invention was funded by the Bio Based Industries Joint Undertaking Public-Private Partnership under the European Union's Horizon 2020 research and innovation programme, under Grant Agreement No 745766.

This invention relates to a process for the synthesis of 2,5-furandicarboxylic acid (FDCA) by the oxidation of 5-hydroxymethylfurfural (HMF).

2,5-furandicarboxylic acid is an oxidised derivative of 5-hydroxymethylfurfural acid that is useful as a monomer for the production of plastics, particularly polyesters. Moreover, as HMF is in turn obtained from sugars, it is a derivative obtained from raw materials that are widely available in nature.

HMF oxidation processes that make it possible to obtain 2,5-furandicarboxylic acid as the main product are known in the literature.

Document U.S. Pat. No. 4,977,283 (Hoechst) describes a method for the oxidation of HMF in the presence of a metal catalyst belonging to the platinum group, carried out in an aqueous environment at a maximum pH of 8. The patent shows that by controlling pH it is possible to influence the proportions between the different oxidation products and by-products. According to the indications included in the patent, pH can be controlled by means of bases, such as sodium or potassium hydroxide, acids or buffer solutions, normally maintaining a pH below 8. The oxidation reaction is conducted at temperatures between 30° C. and the boiling point of water, preferably between 60 and 90° C.; the reaction yield in comparison with the theoretically achievable yield is expressed in relation to the disodium salt of 2,5-furandicarboxylic acid in aqueous solution, and the examples do not show the recovery of the product.

US patent application 2008/0103318 (Battelle) describes a method of HMF oxidation catalysed by supported platinum. The change in selectivity as a function of pH, which must be held at a value of 7 or below, possibly using weak bases such as carbonates and bicarbonates, is also emphasised here. 2,5-furandicarboxylic acid is one of the oxidation products described. The use of strong bases such as NaOH is not recommended because it can lead to secondary reactions such as disproportionation reactions (Cannizzaro reactions).

The metal catalysts used in the HMF oxidation processes described above are however subject to poisoning and consequent loss of catalytic activity. This means that replacement or regeneration of the catalyst is frequently required, adding costs to the already costly use of precious metals such as platinum.

Another process for the platinum-catalysed production of FDCA is described in patent EP 2 601 182 B1, where re-use of the catalyst is made possible through the presence of weak bases; examples show the use of $NaHCO_3$ or magnesium carbonate hydroxide and are conducted at a temperature of 100° C.

Patent application WO 2016/028488 A1 describes an oxidation process in which an aqueous solution containing at least 5% by weight of HMF is placed in contact with a pH-neutral or acidic oxygen source in the presence of a heterogeneous ruthenium-based catalyst. The process is however limited in its selectivity for FDCA, which among the different oxidation products identified reaches a maximum of 60% in moles. This maximum value is also obtained at very high partial oxygen pressures (70 bar). Furthermore the reaction products are solid and require complex operations to separate them from the heterogeneous catalyst. There therefore remains the problem of selectively obtaining a high yield of FDCA and recovering the product through simple separation operations, so as to make industrial production efficient, including from an economic point of view.

There is also a need to produce FDCA having properties that make it suitable for use in polymerisation processes. The low selectivity of known processes typically leads to the formation of many by-products, such as oligomers and molecules with one functional group, salts or conjugated organic substances that can colour the product and influence polymerisation processes.

On the other hand the process for the synthesis of 2,5-furandicarboxylic acid according to the present invention has the considerable advantage of offering a high yield of 2,5-furandicarboxylic acid using a heterogeneous catalyst comprising ruthenium, which can be separated by simple filtration and recycled several times while maintaining its catalytic activity. Furthermore, FDCA is obtained in a dissociated form in the reaction environment; thanks to its solubility in water it can therefore easily be either recovered from the catalyst or purified through solid/liquid separations without requiring the use of organic solvents.

According to a first aspect, the present invention therefore relates in particular to a process for the synthesis of 2,5-furandicarboxylic acid by the oxidation of an aqueous 5-hydroxymethylfurfural solution, catalysed by a heterogeneous catalyst comprising ruthenium in the presence of molecular oxygen and a strong base under controlled pH conditions at a temperature preferably above 100° C.

Under such conditions, despite the use of a strong base, the heterogeneous catalyst comprising ruthenium is in fact surprisingly selective for 2,5-furandicarboxylic acid even in the presence of air as an oxidiser and is even less subject to fouling of the catalyst surface than known processes.

Once separated from the reaction product in a dissociated form in the aqueous solution, the heterogeneous catalyst can therefore be recycled several times in the oxidation reaction while maintaining high yields of FDCA, even in small amounts in comparison to the HMF reagent. The aqueous solution containing the reaction product in dissociated form then undergoes one or more optional purification steps and is finally acidified, providing FDCA in solid form.

In addition, the procedure according to the invention makes it easy to obtain a 2,5-furandicarboxylic acid that is particularly suitable for use as a monomer, especially for the synthesis of polyesters. In fact a monomer with a low yellow index, an indicator of the elimination of oligomers able to interfere with polymerisation, is obtained through simple nanofiltration of the dissociated form of the salt of 2,5-furandicarboxylic acid.

According to another aspect, the invention therefore relates to an FDCA purification process comprising a step of the nanofiltration of an aqueous solution of FDCA in dissociated form, preferably in the form of sodium salt. The operations of purifying FDCA in solid form following this nanofiltration step are further facilitated by the absence of oligomers, as simple washing with water is sufficient to obtain an FDCA composition having a high degree of purity and in particular having a limited content of impurities having a single functional group, making it particularly suitable for use as a monomer for the synthesis of polyesters.

According to a further aspect, the invention therefore relates an FDCA composition with a high degree of purity and a low content of inorganic salts and residual monocarboxylic acids.

The invention will be described in more detail below.

A first object of the present invention is a process for the synthesis of 2,5-furandicarboxylic acid (FDCA) comprising the steps of:
1) oxidising an aqueous solution of 5-hydroxymethylfurfural (HMF) in the presence of molecular oxygen, of a heterogeneous catalyst comprising ruthenium and of a strong base at a temperature above 100° C., obtaining a reaction product that includes a salt of FDCA acid in aqueous solution;
2) separating said heterogeneous catalyst from said reaction product in aqueous solution,
3) reusing said heterogeneous catalyst in the oxidation reaction in step 1).

After possibly undergoing one or more optional purification operations, the reaction product in aqueous solution that includes a salt of FDCA acid separated out in step 2) mentioned above is advantageously neutralised to allow the FDCA acid thus obtained to be subsequently separated out in solid form. This process advantageously involves the use of a quantity of catalytically active phase from 0.5% to 10% by weight compared to the weight of HMF. It also offers the possibility of recycling the catalyst several times while maintaining the reaction yield above 85%, advantageously above 90%.

The starting material undergoing oxidation in step 1) of the process according to the present invention is an aqueous solution of 5-hydroxymethylfurfural (HMF).

HMF can be obtained by the dehydration of sugars, in particular from hexoses such as fructose and glucose deriving from the hydrolysis and possible isomerisation of biomass containing polysaccharides. The dehydration reaction can be carried out according to a variety of techniques that generally involve the use of acid catalysts and may or may not involve the use of aqueous and non-aqueous solvents. For example, HMF obtained from processes using quaternary ammonium salts such as those described in patents EP 2 994 458 B1, EP 3 207 032 B1 or PCT/EP2019/068860 is a suitable starting material.

The HMF used as starting material for the process according to the invention may possibly contain by-products of sugar processing.

An aqueous solution of HMF with a high degree of purity is advantageously used. For example, an aqueous solution prepared from an HMF composition having a purity of preferably more than 98.5% and a quaternary ammonium salt content converted to nitrogen atoms of less than 0.25% by weight in comparison to HMF, preferably less than 0.1% by weight, is particularly suitable. The excessive presence of quaternary ammonium salts may in fact adversely affect the selectivity of the catalyst due to interaction with the active phase.

The purity of HMF is determined for example by HPLC/UV analysis with external calibration. For example, HPLC/UV analysis can be performed using a column such as "Phenomenex Gemini NX-C18" (150 mm×3.0 mm×5 µm; flow: 0.5 mL/min; column temperature: 30° C.) and (A) a 1% v/v aqueous solution of HCOOH and (B) acetonitrile as eluents, with the following gradient:

| min | % v/v A | % v/v B |
|---|---|---|
| 0 | 95 | 5 |
| 5 | 90 | 10 |
| 10 | 60 | 40 |
| 15 | 10 | 90 |
| 17 | 10 | 90 |
| 20 | 95 | 5 |
| 22 | 95 | 5 |

Nitrogen content is for example determined by elemental analysis or ion chromatography analysis using a conductivity detector (CI-CD). The amount of nitrogen from the quaternary ammonium salt can for example be determined stoichiometrically by quantification of the ammonium cation using an external standard by performing CI-CD chromatographic analysis with a Metrosep C4-100 column (100 mm×4.0 mm×5 µm; flow: 1.0 mL/min; column temperature: 30° C.) and a mixture of aqueous nitric acid (7.5 mmol/L) and 20% v/v acetonitrile as eluent.

HMF compositions that have one or more components chosen from organic acids, compounds having at least one keto or aldehyde functional group (other than HMF), dimers, oligomers and humins formed as by-products of the dehydration reaction of the starting saccharides, in total quantities of less than 4%, preferably less than 3%, more preferably less than 1% by weight compared to the weight of HMF, are preferred. HMF compositions having a furfural content of less than 0.10% by weight compared to the weight of HMF are also particularly preferred.

Advantageously, the initial HMF composition includes a quantity of fructose and/or sugar anomers of less than 3% by weight compared to the weight of HMF, preferably less than 0.5% and even more preferably less than 0.1% by weight compared to the weight of HMF. The fructose content can be determined for example by IC-PAD analysis, using a column such as Metrosep Carb 2 (250 mm×4.0 mm×5 µm; flow: 0.7 mL/min; column temperature: 30° C.) and isocratic elution of an aqueous solution of NaOH.

One example of a suitable composition is that obtained by the process described in patent application PCT/EP2019/068860.

In the process according to the present invention the oxidation of HMF takes place in an aqueous solution and does not require the use of organic solvents, as the pH conditions ensure that the product of the oxidation reaction, present in dissociated form, is easily soluble in water as well as HMF. The initial concentration of HMF in aqueous solution is advantageously between 1.5% by weight and 35% by weight, preferably from 2% (corresponding to an HMF:H$_2$0 ratio by weight of 1:50) to 20% by weight, more preferably from 2% to 10% by weight.

In the process according to the invention the oxidising substance responsible for the oxidation of HMF is molecular oxygen or a compound containing molecular oxygen, such as air, oxygen-enriched air or oxygen mixtures with inert gases. The reaction is advantageously carried out in a closed reactor under pressure or by passing a current of O$_2$, air or air enriched with O$_2$ to the reactor.

Although it is favoured by high oxygen pressures, the process according to the invention has the particular advantage of not necessarily requiring them. It is in fact advantageously conducted even with air at pressures above atmospheric pressure but no greater than 2 MPa (20 bar), and consequently at a partial oxygen pressure of less than or equal to 0.5 MPa (5 bar). This makes it possible to limit the amount of $CO_2$ developed during synthesis through the effect of combustion phenomena at high temperatures.

The oxidation step in the process according to the invention is carried out in the presence of a heterogeneous catalyst containing ruthenium. This catalyst is advantageously selected from the group comprising supported ruthenium metal, supported ruthenium oxides, unsupported ruthenium oxides, supported ruthenium hydroxides, unsupported ruthenium hydroxides and mixtures thereof; particularly preferred is the use of supported ruthenium metal or mixtures of supported ruthenium oxides and hydroxides, preferably in the form of $RuO_2$ and $Ru(OH)_x$ respectively, with x advantageously from 2 to 4, preferably equal to 2 or 4, and more preferably equal to 4. The ruthenium oxides in process catalysts according to the present invention may be in hydrated form.

The most suitable materials to form a support for said catalyst are, for example, carbon, non-metal oxides (such as silica and graphene oxide), functionalised graphite and combinations thereof, optionally in the form of multilayers, carbon being particularly preferred. The support material may be in nanostructured and/or functionalised form; it contains the catalytic active phase in quantities preferably between 0.5% and 20% by weight, more preferably 1% to 10% by weight compared to the catalyst, in order to have a good degree of dispersion of the stationary phase on the surface of the support.

In the present invention the preferred catalyst and more specifically the catalytic support is a microporous structure (i.e. pores with width not exceeding about 2.0 nm (20 Å) according to IUPAC classification) with high specific surface area that advantageously favour a high dispersion of active catalytic phase to improve overall activity and selectivity. Supermicroporous structures (with a pore size of 7-20 Angstrom and ultramicroporous structure (with a pore size less than 7 Angstrom) are particularly preferred. The specific surface area of the catalyst according to the present invention is preferably of between 600 and 1200 $m^2/g$, more preferably 700-1100 $m^2/g$ and even more preferably between 800-1000 $m^2/g$.

Supported catalysts according to the invention are therefore prepared preferably starting from supports having a specific surface area of from 800 to 1600 $m^2/g$.

The specific surface area can be measured according to the BET method disclosed in S. Brunauer, P. H. Emmett and E. Teller, J Am. Chem. Soc., 1938, 60, 309, measuring the amount of gas adsorbed on the surface of a material.

Depending on the value of specific surface area of the material, nitrogen or helium are used as gas.

The BET specific surface area of mesoporous materials (values of between 50-400 $m^2/g$) is herein measured by determining the amount of nitrogen adsorbed at 77 K and P/Po of approximately 0.3 and assuming a nitrogen or argon cross sectional area of 16.2 $Å^2$, after degassing the catalyst sample at 100° C. overnight in vacuum at about $0.13*10^{-3}$ Pa.

The BET specific surface area of microporous materials (values of between 400-1000 $m^2/g$) is herein measured by determining the amount of helium adsorbed at 4.2 K and P/Po of approximately 0.3 and assuming a helium cross sectional area of 1 $Å^2$, after degassing the catalyst sample at 100 ° C. overnight in vacuum at about $0.13*10^{-3}$ Pa.

According to a preferred aspect of the present invention, the cumulative pore volume value of the catalyst is preferably from 0.25 to 0.8 $cm^3/g$, preferably from 0.3 to 0.6 $cm^3/g$, its microporous specific surface area is preferably from 900 to 1100 $m^2/g$ and the microporous size is preferably from 3.5 to 5 Angstrom.

The ruthenium-based catalyst, whether it is ruthenium metal, an oxide or hydroxide or a mixture thereof, in a supported form, can be prepared according to techniques known to those skilled in the art.

For example, supported oxides and hydroxides can be prepared by finely dispersing a metal salt on the substrate through grafting, sol-gel, heat treatment, steam explosion, combustion, deposition, adsorption from a solution, co-precipitation or impregnation, e.g. by incipient wetness impregnation or CVD (chemical vapour deposition).

The step of preparing the catalyst can be carried out separately from the oxidation process according to the present invention or may take place at a preliminary step in the same.

According to one aspect of the invention, the catalyst contains ruthenium as an active catalytic species, possibly in combination with structural promoters able to improve its performance. For example, oxides and mixed oxides of metals may act as structural promoters.

The process according to the invention may optionally be carried out in the presence of one or more catalysts other than ruthenium, selected for example from platinum, palladium, iron, manganese, copper, cobalt, nickel. These metals may be used in the form of supported catalysts and in the form of mixed metals, e.g. polyoxometalates.

In a preferred embodiment of the process according to the invention, the catalyst includes, or is more preferably composed of, Ru supported on carbon, preferably in quantities between 1% and 10% by weight, preferably in combination with structural promoters such as sodium, caesium, barium, potassium, bismuth (e.g. $Na_2O$).

According to one aspect of the invention, during the oxidation reaction mixed ruthenium oxides and hydroxides such as $Ru(OH)_x+RuO_2/C$ are formed in situ from ruthenium metal due to the presence of a diluted strong base such as NaOH.

In another preferred embodiment of the process according to the invention the catalyst includes, or is more preferably composed of, $Ru(OH)_x$ supported on carbon.

In another preferred embodiment of the process according to the invention the catalyst includes, or is more preferably composed of, ruthenium oxide, preferably in combination with structural promoters e.g. sodium, caesium, barium, potassium, bismuth (e.g. $Na_2O$).

The catalyst used in the process according to the present invention is used in limited quantities compared to the amount of reagent. Advantageously the quantity of metal catalyst is less than 10% by weight compared to the weight of HMF, preferably less than 8% by weight and even more preferably less than 6% by weight compared to the weight of HMF; said catalyst being present in quantities advantageously greater than 0.5%, preferably greater than 0.6% by weight and even more preferably greater than 0.7% by weight compared to the weight of HMF.

The oxidation reaction of 5-hydroxymethylfurfural is conducted at a temperature above 100° C. but preferably below 160° C., more preferably 150° C. or below and advantageously 140° C. or below.

In the presence of a ruthenium-based catalyst the catalytic efficacy is higher for oxidation temperatures of 110° C. or above, so temperatures of 120° C. or above, and more preferably temperatures of 130° C. or above, are preferred.

The strong bases whose presence is necessary for the conduct of step 1) of the present invention preferably have a solubility in water at 25° C. of 45 g/l or higher, more preferably of 100 g/l or higher and even more preferably of 200 g/L or higher. Advantageously, the strong bases of the present invention are selected from the group consisting of sodium hydroxide, potassium hydroxide, ammonia, ammonium hydroxide, barium hydroxide, lithium hydroxide, caesium hydroxide, strontium hydroxide, rubidium hydroxide, trimethylamine, methylamine, diethylamine. Soluble bases with a hydroxide group are preferred, sodium hydroxide being particularly preferred as it facilitates subsequent purification operations.

These bases have the function of bringing the initial reaction mixture to neutral pH and then buffering the acidity resulting from the formation of FDCA; they are used in quantities necessary to maintain the pH of the reaction environment between 6.5 and 9.

These strong bases are preferably added gradually over the course of the reaction as a function of the reaction rate (and consequent change in pH), as much as possible avoiding the presence of excesses in the reaction mixture that could lead to condensation reactions and the formation of sodium oxides, which have a passivating effect on the active phase of the catalyst.

The pH is therefore advantageously 7 or above and 8.5 or below, preferably greater than or equal to 7.5 and less than or equal to 8.

Under these conditions, it has been established that the catalyst maintains its catalytic activity almost unchanged, and its re-use allows FDCA to be produced selectively with almost total conversion of HMF. It may be recycled several times while continuing to maintain an FDCA production yield in excess of 90%.

If the reaction is carried out by introducing a poorly soluble base such as basic magnesium carbonate instead of sodium hydroxide, it tends to settle on the surface of the catalyst, reducing its activity in comparison with the use of gradually fed NaOH, limiting the possibility of recycling it.

The strong base is preferably fed as a conveniently diluted aqueous solution, i.e. at concentrations from preferably 50 g/kg to 350 g/kg, more preferably from 150 g/kg to 300 g/kg.

This oxidation step 1) is preferably carried out in reactors that are suitably agitated or in any case able to ensure a high gas-liquid-solid interface area, such as reactors with internal or external recirculation, reactors with mechanical agitation or gas-induced agitation, or fixed bed, e.g. Jet-Loop or air-lift type, reactors. In addition to limiting reaction times, which typically range from 12 hours to 6-8 hours, this characteristic also has a positive impact on catalyst activity and selectivity.

At the end of the oxidation reaction (step 1), the 2,5-furandicarboxylic acid produced according to the present invention is present in aqueous solution in dissociated form.

In step 2) of the process according to the present invention the heterogeneous catalyst is separated from this reaction product in aqueous solution by means of known techniques.

According to one aspect of the process according to the invention, the heterogeneous catalyst in step 2) is separated out through at least one operation chosen from the group consisting of: filtration, decantation, centrifugation and separation by electrochemical cells or by electrostatic precipitators, wet scrubbers or hydrocyclones.

This separation is advantageously carried out through one or more identical or different filtration operations, performed in series or in parallel, for example belt filtration, rotary drum filtration, filter press filtration, candle filtration.

Among the filtration operations, microfiltration and ultrafiltration are preferred, carried out through membranes of suitable material and, for example, with tangential flow.

Tangential flow microfiltration (TFF), preferably performed on sintered steel or ceramic membranes, is particularly suitable for catalyst separation.

According to a preferred aspect of the process of the present invention, the heterogeneous catalyst is separated from the reaction product in step 2) through at least one tangential flow microfiltration; the said microfiltration is advantageously accompanied by one or more washings of the said catalyst with water.

This filtration operation is advantageously carried out at basic pH and at temperatures above 40° C. to keep the FDCA salt in solution.

The catalyst thus separated out in step 2) may, according to step 3) of the invention process, be reused, as such or preferably after washing and/or regeneration, in oxidation step 1).

According to this step 3), the catalyst separated out in step 2) may be fed to the oxidation reaction in step 1) alone or, preferably, in addition to an aliquot of fresh catalyst. This feed is advantageously in the form of an aqueous slurry with a concentration of preferably not more than 95% by weight; maintaining the catalyst in suspension in fact helps to maintain correct catalytic activity.

These operations of washing and/or regeneration of the separate catalyst in step 2) are advantageously performed using water and at a temperature of 40-60° C. in order to dissolve any reaction products and by-products that might be adsorbed on the surface of the catalyst, and to restrict fouling of the active phase.

The quantity of water used varies according to the quantity and nature of the reaction products and by-products present; several repeated washing operations are advantageously carried out.

According to a preferred aspect, the catalyst washing water is reused to dilute the reaction product during the subsequent operations of purifying the 2,5-furandicarboxylic acid salt. This mode of operation is particularly advantageous because overall it enables small volumes of water to be used, while increasing recovery yields.

Once the catalyst has been separated, FDCA can be obtained in solid form by neutralising the reaction product in aqueous solution. The FDCA thus obtained is easily recovered using known techniques, for example one or more separation operations chosen from filtration, decantation, centrifugation. Alternatively FDCA can be obtained in solid form by crystallisation from the aqueous solution of FDCA in the form of salt and subsequent filtration.

Neutralisation of the reaction product is advantageously effected by adding inorganic acids such as sulfuric acid, hydrochloric acid, nitric acid or acetic acid at concentrations preferably between 20% to 70%, more preferably from 40% to 60%.

If the strong base used in the first step is caustic soda, sulfuric acid is advantageously used.

A person skilled in the art will easily be able to identify methods of precipitation (e.g. in terms of quantity and method of adding the acid) that will enable optimum particle size of the precipitate and its level of recovery to be obtained, limiting incorporation of the inorganic salts formed in the precipitate itself and the other organic by-products or intermediates that may be present. The particle size of the precipitate affects recovery and eventual purification of the FDCA produced in solid form. FDCA in solid form is purified according to known techniques. It can, for example, be performed by washing and subsequent solid/liquid separations before final drying, by crystallisation operations or by extraction with organic solvent (e.g. acetone, methanol, ethanol).

Among solid/liquid separations, filtration operations are preferred; suitable examples of these are candle filtration, belt filtration, rotary filtration (rotary drum centrifuge), press filtering, while candle filtration and belt filtration are preferred. These operations are preferably carried out when hot (50-60° C.), but have the advantage that they do not require high temperatures to be reached, to the point that condensation phenomena are favoured; they can be facilitated by diluting the reaction product with water. They also make it possible for salts deriving from acidification operations and partial oxidation products of HMF (e.g. residual monocarboxylic acids), which affect the properties of the final product, to be removed. They also allow further washing of the FDCA in solid form.

According to a particularly advantageous aspect, when FDCA is separated out in solid form by filtration, the neutralised reaction product is suitably diluted by using the catalyst wash water.

According to a particularly preferred embodiment of the invention, after step 2) and before the precipitation of FDCA, the process includes an (optional) step of purification of the salt of 2,5-furandicarboxylic acid present in the reaction product by means of known techniques, for example through one or more membrane separation operations (filtration), passage through bleaching ion exchange resins or hydrogenation reactions. This purification is preferably performed through at least one nanofiltration membrane filtering operation; this operation effectively removes high molecular weight condensation products (oligomers) which would colour the finished product from the 2,5-furandicarboxylic acid salt.

The colorimetric analysis of the solid FDCA obtained according to this embodiment by spectrophotometry in fact shows a yellow index (Yellow Index, YI) that is advantageously below 20, more advantageously below 15 and even more advantageously equal to or less than 5. Without wishing to be bound to any theory, the presence of impurities giving rise to this yellow index appears to have an adverse influence on polymerisation, in particular on the degree of polymerisation and viscosity (branching).

Depending on the characteristics of the reaction product subjected to the filtration operation, a person skilled in the art will be able to select the type of membrane to be used, taking into account the material of which it is made, its electrochemical properties and its porosity. On the basis of the characteristics of the selected material, the person skilled in the art will also be able to easily select the optimum pH conditions and operating pressures for each separation operation and evaluate the desirability of performing one or more diafiltration steps (i.e. dilution of the retentate by adding water and repeating the separation operation).

For example, filtration operations are typically carried out using both organic membranes of natural origin (e.g. rubber, polysaccharides) or synthetic membranes (e.g. polymer membranes), and inorganic membranes, such as ceramic, metal or glass membranes.

Among organic membranes, polyamides, polyimides, polyalkylenes, polyether imides, polyether ethers, poly(ether ketones), polycarbonates, cellulose acetate and derivatives are preferred, membranes made of polypiperazine amide with low rejection of organic salts being particularly preferred.

Specific examples of suitable organic membranes are polysulfones, aromatic polyamides, polypiperazine amide, polyethylene, polytetrafluoroethylene (PTFE), polypropylene, polyvinyl alcohol, polystyrene, polybenzimidazoles (PBI), polyphenylenes, polyphosphazenes, polyvinylidene fluoride (PVDF), polyethersulfones (PES), polyacrylonitrile (PAN), polyvinyl chloride (PVC).

Both isotropic (or symmetrical) and anisotropic (or asymmetrical) membranes and composite membranes are suitable. Anisotropic membranes are preferably used.

Dense membranes (with pore size<1 nm) are preferably used in this process in the optional purification phase. Porous membranes (i.e. with a pore size between 1 nm and 10 μm, e.g. macroporous membranes>50 nm, mesoporous membranes between 2 nm and 50 nm or microporous membranes between 1 nm and 2 nm) may also be advantageously used, particularly during step 2) of separating the catalyst from the reaction product.

The membranes used in the nanofiltration purification step according to the invention have an average pore size of 5 nm or less, even more advantageously an average pore size corresponding to a molecular weight cut-off or MWCO from approximately 700 to approximately 300 Da. These characteristics make the separation of FDCA sodium salts particularly efficient.

The membranes may be formed in different configurations, for example in flat, tubular, capillary or hollow fibre forms. Flat membranes can be used as they are in filter-press type systems, in rotary systems or wrapped in spiral modules to increase the surface area/occupied volume ratio.

Membrane separation operations according to the invention may be carried out in batches or continuously; depending on the case, a normal (perpendicular) or tangential flow filtration method is preferably used. Membrane separation operations in a tangential flow regime are preferred.

The nanofiltration operations are preferably carried out according to the invention using membranes of a material chosen from the group consisting of polysulfones, polypiperazine amide, polyamide, polyimide.

According to a preferred aspect, nanofiltration is carried out in tangential flow (TFF) with spiral wound polymer membranes.

Several nanofiltration operations are advantageously performed in series, possibly preceded by dilution and/or followed by a series of diafiltrations. The quantity of water added varies according to the quantity and type of reaction products and by-products present.

According to one particularly advantageous aspect, catalyst wash water is used in the nanofiltration purification operation.

A person skilled in the art will easily be able to identify the appropriate operating conditions for maintaining the sodium salt of FDCA in solution, avoiding excessive dilution and, at the same time, minimising fouling of the membrane.

To this end, the concentration of the reaction product undergoing nanofiltration is also preferably kept below 50 g/kg to limit precipitation of the 2,5-FDCA salt which would tend to cause fouling of the membrane.

According to this embodiment of the invention, the permeate is advantageously concentrated to suitable values to facilitate the recovery of FDCA in solution by means of known techniques, for example by evaporation.

This concentration is preferably performed by osmosis, taking care to maintain solubility conditions for the FDCA salt to avoid it precipitating on the membrane.

FDCA is then obtained in solid form as described above.

Advantageously the FDCA obtained has a purity of over 98.5%, more advantageously over 99% and even more advantageously over 99.5%, and an inorganic salt (e.g. sulfates) content of less than 500 ppm and a residual monocarboxylic acid content of less than 1%, preferably less than 0.5% by weight compared to the weight of FDCA, making it particularly suitable for use as a monomer in the synthesis of polyesters.

A second object of the present invention is therefore an FDCA composition characterised by a 2,5-furandicarboxylic acid of purity above 99%, preferably above 99.5%, an inorganic salt content of less than 500 ppm and a monocarboxylic acid content of less than 1%, preferably less than 0.5% by weight and more preferably less than 0.1% by weight, compared to the weight of FDCA. Among the monocarboxylic acids, the FDCA composition of the inventions comprises advantageously an amount of 2-furanacetic acid of 0.1% by weight with respect to the weight of FDCA or below (preferably of 0.05% or below) and/or an amount of levulinic acid advantageously of 0.1% or below (preferably of 0.05% or below) by weight with respect to the weight of FDCA.

Purity and monocarboxylic acid content are for example determined by HPLC/PDA analysis after external calibration. For example, HPLC/PDA analysis can be carried out using a Rezex column of the "ROA-Organic Acid H+(8%)" 300×7.8 mm type by isocratic elution of a 0.005 N aqueous $H_2SO_4$ solution with a flow of 0.6 mL/min at a temperature of 60-65° C., recording at 254 nm and 285 nm.

The content of inorganic salts and in particular of inorganic anions is determined for example by ion chromatography with conductivity detector (CI-CD) using a "Metrosep A Supp 5" 250 mm×4.0 mm×5 μm column on stationary phase, e.g. based on polyvinyl alcohol with quaternary ammonium groups, by isocratic elution of an aqueous solution of 3.2 mM $Na_2CO_3$+1 mM $NaHCO_3$; flow: 0.7 mL/min; column temperature 30° C.

The present invention also relates to the use of this composition in polymerisation reactions, in particular for the synthesis of polyesters.

The above compositions can be advantageously obtained by subjecting an aqueous solution of FDCA in dissociated form to at least one nanofiltration step followed by neutralisation, precipitation and purification with at least one wash with water followed by solid/liquid separation.

A third object of the present invention is therefore an FDCA purification process comprising a step of nanofiltration of an aqueous solution of FDCA in dissociated form, followed by precipitation of the FDCA and a step of washing the FDCA thus obtained in solid form with water.

According to one aspect of said purification process, said aqueous solution of FDCA in dissociated form is advantageously prepared according to the process for the synthesis of 2,5-furandicarboxylic acid described above, in particular that obtained after step 2) of separation from the catalyst.

According to another aspect, said aqueous solution of FDCA in dissociated form is advantageously prepared by a process of oxidising an aqueous solution of HMF in the presence of a gas containing oxygen and a supported catalyst containing a metal of the platinum group, preferably platinum, carried out in an aqueous solution in which the pH is maintained above 7 and below 12, preferably through the addition of weak bases or the progressive addition of strong bases. Examples of weak bases are sodium bicarbonate, potassium bicarbonate, sodium carbonate, potassium carbonate, calcium carbonate, magnesium carbonate, calcium hydroxide, magnesium hydroxide, dibasic and tribasic phosphate buffers and mixtures thereof. Even more advantageously, said aqueous FDCA solution in dissociated form is prepared according to the process for the synthesis of 2,5-furandicarboxylic acid described in patent EP 2 601 182 B1.

In both cases, the initial HMF solution is advantageously prepared from an HMF composition obtained as described in patent application PCT/EP2019/068860.

The processes according to the invention may be carried out in both batch and continuous form and advantageously do not require the use of organic solvents.

The process according to the invention will now be described in a non-exhaustive way in the following examples.

EXAMPLES

The catalyst used in the following examples was prepared from an aqueous solution of $RuCl_3$ (8.3 mM) and an activated carbon support with a specific surface area of 1500 $m^2/g$. Approximately 286 mL of solution was used for about 10 g of support. After 15 minutes of vigorous stirring the solid was separated, washed with demineralised water and dried overnight at 50° C.

The powder obtained was treated with NaOH (1.0 M, approximately 28 mL) with agitation for 24 h. The solid was then dried at 140° C. for another 24 hours, yielding a $Ru(OH)_3/C$ catalyst containing about 5% of ruthenium.

Example 1

Step 1) 1kg of a 2% aqueous solution of HMF (HMF 20 g/kg) and a supported catalyst based on ruthenium hydroxide ($Ru(OH)_x/C$ 5% prepared as described above, x=3) were loaded into a 2 L autoclave in order to have a Ru/HMF ratio by weight of 5%.

The reactor was brought to a pressure of 20 bar with air and heated to an internal temperature of 130° C.

The reactor was fed with an air flow of 150 NL/h for 16 hours, continuously feeding an aqueous caustic soda solution (150 g/kg) to maintain a constant pH value between 7.5 and 8.

Step 2)

The final aqueous solution containing the reaction product (FDCA salts and reaction intermediates) was filtered from the catalyst (through a 0.22 μm diameter millipore septum) and analysed by liquid chromatography—PDA in a Rezex column with 0.005N $H_2SO_4$ eluent (Flow=0.6 mL/min; temperature=60° C.).

A synthesis yield of 88%, calculated as the ratio of the molar concentration of the salt of 2,5-FDCA in the synthesis solution obtained by chromatographic analysis to that calculated theoretically taking the initial molar concentration of the HMF solution fed to the process into account, was obtained.

Step 3)

The catalyst recovered by filtration in step 2) was reused as such under the process conditions reported for step 1). Although the conditions for the recovery of catalyst from step 2) had not been optimised, a synthesis yield of 2,5-FDCA of 78% was obtained, calculated as indicated above.

Comparative Example 1

Step 1)

1 kg of a 2% aqueous solution of HMF (HMF 20 g/kg) and a supported catalyst based on ruthenium hydroxide (Ru(OH)$_3$/C 5% as in Example 1) were loaded into a 2 L autoclave in order to have a Ru/HMF ratio by weight of 5%. The reactor was charged with Magnesium hydroxide with molar ratio respect to HMF 1:2.

The reactor was brought to a pressure of 20 bar with air and heated to an internal temperature of 130° C., then fed with an air flow of 150 NL/h for 16 hours.

Step 2)

The final aqueous solution containing the reaction product (FDCA salts and reaction intermediates) was separated from the catalyst by filtration (through a 0.22 μm diameter millipore septum) and analysed by liquid chromatography—PDA in a Rezex column with 0.005N H$_2$SO$_4$ eluent (Flow=0.6 mL/min; temperature=60° C.).

A synthesis yield of 83%, calculated as the ratio of the molar concentration of the salt of 2,5-FDCA in the synthesis solution obtained by chromatographic analysis to that calculated theoretically taking the initial molar concentration of the HMF solution fed to the process into account, was obtained.

The separated catalyst has been characterized in terms of specific surface area, pore size distribution and cumulative volume pores and compared to those of the fresh catalyst and to those of the catalyst recovered after Example 1 (catalyst recovered by filtration before its reuse).

| Catalyst | Base | Micropores Specific surface area (measured with He) [m$^2$/g] | Pore volume [cm$^3$/g] |
|---|---|---|---|
| fresh | — | 977 | 0.58 |
| Comparative Example 1 (after 1st use) | Mg(OH)$_2$ | 190 | 0.02 |
| Example 1 (after 1st use) | NaOH | 942 | 0.55 |

A drastic reduction of specific surface area and accessible pore volume can been observed in Comparative example 1 wherein an insoluble weaker base as Mg(OH)$_2$ has been used. The catalytic characteristics has been preserved instead in presence of a soluble strong base in Example 1.

The fouling of active surface is confirmed by also X-ray photoelectron spectroscopy (XPS) analysis of the atomic composition profile (see Table below), which demonstrates a relevant quantity of magnesium deposited on ruthenium respect to sodium limiting the catalytic activities of ruthenium oxide/hydroxide:

| Catalyst | Base | Ru [%] | Magnesium [%] | Sodium [%] |
|---|---|---|---|---|
| fresh | — | 1.1 | — | 1.3 |
| Comparative Example 1 (after 1st use) | Mg(OH)$_2$ | 0.1 | 15.1 | 1.2 |
| Example 1 (after 1st use) | NaOH | 1.05 | — | 1.8 |

The XPS spectra were collected using an Escalab 200-C VG spectrometer with a 5-channeltron hemispheric analyser, equipped with a double anode source that separately transmits non-monochromatic X radiation corresponding to Mg Kα line (energy=1253.6 eV, line width=0.7 eV) and to Al Kα line (energy=1486.6 eV, line width=0.8 eV) and a pressure in the analysis chamber during the measurement of about 5×10$^{-9}$ mbar. The analyzed area was 3 mm$^2$.

Step 3)

The catalyst recovered by filtration in step 2) was reused as such under the process conditions reported for step 1). A synthesis yield of 2,5-FDCA of merely 67% was obtained, calculated as indicated above.

Example 2

Step 1)

10 kg of a 10% aqueous solution of HMF (HMF 100 g/kg) and a supported ruthenium hydroxide based catalyst (Ru (OH)$_x$+RuO$_2$/C 5%), in which x=3 in order to have a Ru/HMF ratio by weight of 0.75%, were loaded into a 10 L Jet-loop reactor.

The reactor was brought to a pressure of 20 bar with air and heated to an internal process temperature of 130° C.

The reactor was fed with an air flow of 20 NL/min for 8 hours, continuously feeding an aqueous solution of caustic soda (250 g/kg) at a variable flow rate directly managed by a pH management and control apparatus for the process step to maintain a pH value between 7.5 and 8.

Step 2)

The final aqueous solution containing the reaction product (FDCA salts and reaction intermediates) was separated from the catalyst by tangential filtration on a 2 μm sintered steel filter and analysed by liquid chromatography as shown in the example above.

A synthesis yield of 2,5-FDCA of 95% in comparison with that theoretically calculated taking into account the initial concentration of the HMF solution fed to the process, was obtained.

Step 3)

The catalyst recovered through filtration during step 2) was washed with water at 50° C., filtered and reused under the process conditions reported for step 1). The re-use operation was repeated several times. The table shows the results for yield, calculated as the ratio of the concentration of the 2,5-FDCA salt in the synthesis solution to that theoretically calculated taking into account the initial concentration of HMF solution fed to the process:

| Re-use | Yield (%) |
|---|---|
| I | 98.2 |
| II | 90.8 |
| III | 91.9 |
| IV | 90.8 |

The 2,5-FDCA salt solution was appropriately diluted to a concentration of 10 g/kg. The solution was processed by a spirally wound membrane nanofiltration system with tangential flow using a membrane with a cut-off of 300-500 Da in polypiperazine amide. The process described in this way, operating at a constant flow condition of 10-15 L/h/m$^2$ made it possible to achieve salt rejection of the salts from the monomer of 38%.

The retentate contained impurities deriving from aldol condensation phenomena (coloured substances YI=80).

The permeate containing the aqueous solution of the sodium salt of 2,5-FDCA was subsequently concentrated by osmotic processes up to a concentration not exceeding 50 g/kg. The total recovery yield for the monomer was 85% by weight (compared to the FDCA produced).

2,5-FDCA was recovered in acid form by precipitation processes with 5M dilute sulfuric acid. The precipitated solid was recovered by candle filtration of the slurry obtained and then washed and dried.

The composition of FDCA obtained was analysed by liquid chromatography to assess the purity of the monomer itself as indicated above.

The residual sulfate content was evaluated by means of ion chromatography with a conductivity detector (Metrohm CI-CD) using a "Metrosep A Supp 5" column (250 mm×4.0 mm×5 um) with polyvinyl alcohol bearing quaternary ammonium groups as the stationary phase (isocratic elution of an aqueous solution of 3.2 mM $Na_2CO_3$+1 mM $NaHCO_3$; flow: 0.7 mL/min; column temperature: 30° C.).

The sulfate content was less than 200 ppm.

The monomer obtained had a purity of 99.5%, a furoic acid content of less than 0.05%, a furancarboxyaldehyde content of 0.3% and a formyl furoic acid content of 0.02%.

The invention claimed is:

1. A process for the synthesis of 2,5-furandicarboxylic acid (FDCA) comprising the steps of:
   1) oxidising an aqueous solution of 5-hydroxymethylfurfural (HMF) in the presence of molecular oxygen, of a heterogeneous catalyst comprising ruthenium and of a strong base at a temperature above 100° C., obtaining a reaction product in aqueous solution comprising a salt of FDCA acid;
   2) separating said heterogeneous catalyst from said reaction product in aqueous solution,
   3) re-using said heterogeneous catalyst in the oxidation reaction in step 1),
   wherein said heterogeneous catalyst comprising ruthenium is selected from the group consisting of supported ruthenium, supported ruthenium oxides, supported ruthenium hydroxides, unsupported ruthenium hydroxides and mixtures thereof,
   wherein, for the supported catalysts, the support is selected from the group consisting of carbon, non-metal oxides, functionalised graphite and combinations thereof;
   wherein the pH is maintained from 6.5 to 9 during the oxidation in step 1).

2. The process according to claim 1 in which the said strong base has a solubility in water at 25° C. of 45 g/l or higher.

3. The process according to claim 1 in which the oxidation in step 1) is carried out at a temperature below 160° C.

4. The process according to claim 1 in which said separation of the heterogeneous catalyst in step 2) is carried out by at least one operation selected from the group consisting of: filtration, decantation, centrifugation and separation by electrochemical cells, electrostatic precipitators, wet scrubbers or hydrocyclones.

5. The process according to claim 4 in which said separation of the heterogeneous catalyst in step 2) is carried out through at least one tangential flow microfiltration.

6. The process according to claim 1 in which the catalyst is washed and/or regenerated after step 2) and before re-use in step 3).

7. The process according to claim 1 in which after step 2) the said reaction product in aqueous solution is purified by at least one nanofiltration operation.

8. The process according to claim 6 in which the catalyst is washed with water and the resulting catalyst washing water is used in the purification operation by nanofiltration.

9. The process according to claim 1 in which the reaction product in aqueous solution is subjected to neutralisation and subsequent separation of the FDCA acid thus obtained in solid form.

10. The process according to claim 2 in which the pH is maintained from 6.5 to 9 during the oxidation in step 1).

11. The process according to claim 2 in which the oxidation in step 1) is carried out at a temperature below 160° C.

12. The process according to claim 1 in which the oxidation in step 1) is carried out at a temperature below 160° C.

13. The process according to claim 10 in which the oxidation in step 1) is carried out at a temperature below 160° C.

14. The process according to claim 2 in which said separation of the heterogeneous catalyst in step 2) is carried out by at least one operation selected from the group consisting of: filtration, decantation, centrifugation and separation by electrochemical cells, electrostatic precipitators, wet scrubbers or hydrocyclones.

15. The process according to claim 1 in which said separation of the heterogeneous catalyst in step 2) is carried out by at least one operation selected from the group consisting of: filtration, decantation, centrifugation and separation by electrochemical cells, electrostatic precipitators, wet scrubbers or hydrocyclones.

16. The process according to claim 3 in which said separation of the heterogeneous catalyst in step 2) is carried out by at least one operation selected from the group consisting of: filtration, decantation, centrifugation and separation by electrochemical cells, electrostatic precipitators, wet scrubbers or hydrocyclones.

17. The process according to claim 10 in which said separation of the heterogeneous catalyst in step 2) is carried out by at least one operation selected from the group consisting of: filtration, decantation, centrifugation and separation by electrochemical cells, electrostatic precipitators, wet scrubbers or hydrocyclones.

18. The process according to claim 13 in which said separation of the heterogeneous catalyst in step 2) is carried out by at least one operation selected from the group consisting of: filtration, decantation, centrifugation and separation by electrochemical cells, electrostatic precipitators, wet scrubbers or hydrocyclones.

* * * * *